(12) United States Patent
Steven

(10) Patent No.: US 11,079,001 B2
(45) Date of Patent: Aug. 3, 2021

(54) GEAR FOR A TRANSMISSION WITH INCLINED SIDEWALLS

(71) Applicant: Advanced Electric Machines Group Limited, Washington (GB)

(72) Inventor: Andrew Steven, Newcastle upon Tyne (GB)

(73) Assignee: Advanced Electric Machines Group Limited, Washington (GB)

(*) Notice: Subject to any disclaimer, the term of this patent is extended or adjusted under 35 U.S.C. 154(b) by 61 days.

(21) Appl. No.: 16/484,625

(22) PCT Filed: Feb. 14, 2018

(86) PCT No.: PCT/GB2018/050395
§ 371 (c)(1),
(2) Date: Aug. 8, 2019

(87) PCT Pub. No.: WO2018/150175
PCT Pub. Date: Aug. 23, 2018

(65) Prior Publication Data
US 2020/0040980 A1 Feb. 6, 2020

(30) Foreign Application Priority Data
Feb. 15, 2017 (GB) ..................................... 1702473

(51) Int. Cl.
*F16H 55/17* (2006.01)
*F16H 48/40* (2012.01)

(52) U.S. Cl.
CPC ............. *F16H 55/17* (2013.01); *F16H 48/40* (2013.01)

(58) Field of Classification Search
CPC ..... F16H 2048/385; F16H 48/40; F16H 55/17
See application file for complete search history.

(56) References Cited

U.S. PATENT DOCUMENTS

| | | | |
|---|---|---|---|
| 5,086,660 A | 2/1992 | Swars | |
| 5,480,360 A | 2/1996 | Patzer et al. | |
| 2015/0267798 A1 | 9/2015 | Biermann et al. | |
| 2016/0363206 A1 | 12/2016 | Modrzejewski et al. | |
| 2017/0299035 A1* | 10/2017 | Wakui | F16H 48/08 |

FOREIGN PATENT DOCUMENTS

| | | |
|---|---|---|
| DE | 1116069 B | 10/1961 |
| DE | 102016209481 A1 | 12/2016 |
| GB | 754348 A | 8/1956 |
| WO | 2015106962 A2 | 7/2015 |

* cited by examiner

*Primary Examiner* — Jake Cook
(74) *Attorney, Agent, or Firm* — E. Eric Mills; Nexsen Pruet, PLLC

(57) ABSTRACT

A gear for use in a transmission system. The gear comprises an outer annular element having gear teeth on a radially outer surface thereof and an inner support element arranged coaxially with the outer annular element. The gear further comprises first and second opposing side walls, each side wall extending from the outer annular element to the inner support element to form an annular space. At least one of the first and second side walls extends from the outer annular element at an angle greater than 0 degrees with respect to a direction perpendicular to the rotational axis of the gear.

10 Claims, 5 Drawing Sheets

GEAR FOR A TRANSMISSION WITH INCLINED SIDEWALLS

CROSS REFERENCE TO RELATED APPLICATIONS

This application is a 35 U.S.C. § 371 U.S. national phase entry of International Application No. PCT/GB2018/050395 having an international filing date of Feb. 14, 2018, which claims the benefit of Great Britain Application No. 1702473.8 filed Feb. 15, 2017, each of which is incorporated herein by reference in its entirety.

The present invention relates to a gear for use in a transmission system. In particular, but not exclusively, embodiments of the present invention relate to a gear that can better withstand increased loading associated with high speed transmission systems.

Gears in transmission systems are traditionally solid gears for maximum stiffness and increased strength. However, solid gears can be undesirable since they can significantly increase the weight of the gearing system resulting in reduced economy, and can be expensive to produce.

Gears typically experience both axial translation and rotational effects (i.e. bending of the outer rim) when loads are applied in use. This is because the force acting on the helical gear from an adjacent meshing gear includes an axial component. The axial component of the force can cause the gear to bend at the outer rim. This bending produces a rotation of the gear outer rim, about an axis tangential at the circumference of the rim, perpendicular to the gear main axis of rotation, at the point of contact with the mating gear. Typically in transmission applications even microscopic rotations (bending of the gears) can prevent teeth of the gear from meshing together with teeth of adjacent gears as intended, (non-conjugate meshing). This can increase gear local contact stress, transmission error and noise which can lead to premature gear failure.

Pure axial translation deflections of the gear rim generally do not have a detrimental effect on meshing of adjacent gears and so should have minimal effect on gear noise, local contact stress or wear.

Hollow gears have previously been designed to reduce weight of transmission systems. Such hollow gears have been used in relatively large gearing systems such as marine or wind turbine gears to reduce weight, and therefore cost. However, hollow gears can detrimentally affect the stiffness and strength of the gear compared to a solid gear, thereby increasing the risk of the wheel rim rotational effects and axial translations discussed above.

WO2015/106962 relates to a differential gearing for a motor vehicle having a hollow driving gear.

According to a first aspect of the present invention there is provided a gear for use in a transmission system, the gear comprising:
- an outer annular element having gear teeth on a radially outer surface thereof;
- an inner support element arranged coaxially with the outer annular element;
- first and second opposing side walls, each side wall extending from the outer annular element to the inner support element to form an annular space,
- wherein, at least one of the first and second side walls extends from the outer annular element at an angle greater than 0 degrees with respect to a direction perpendicular to the rotational axis of the gear.

Certain embodiments of the invention provide the advantage that the gear is more resistant to higher gear loading that is often associated with higher speed transmission systems.

Certain embodiments of the invention provide the advantage that the weight of a gear can be reduced compared to known gears.

Certain embodiments of the invention provide the advantage that rotational deflection of the gear rim, caused by axial forces, can be reduced compared to known gears.

Certain embodiments of the invention provide the advantage that wear of the gear teeth is reduced compared to known gears, resulting in an increased lifetime of the gear.

Certain embodiments of the invention provide the advantage that gear noise can be reduced in a transmission system compared to known systems.

Embodiments of the invention are further described hereinafter with reference to the accompanying drawings, in which.

In the drawings like reference numerals refer to like parts.

Figure 1:
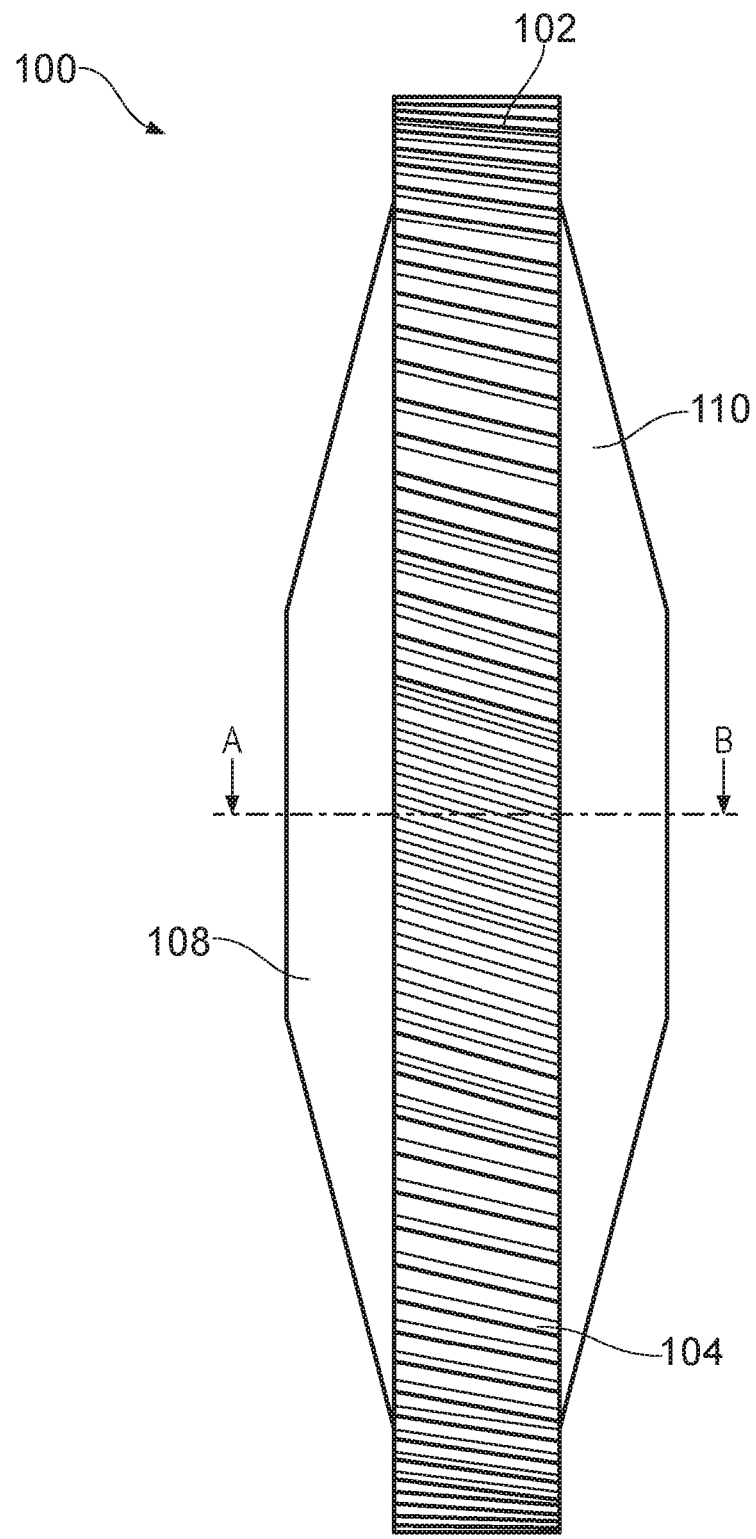
FIG. 1 is a front view of an example of a hollow gear.
Figure 2:
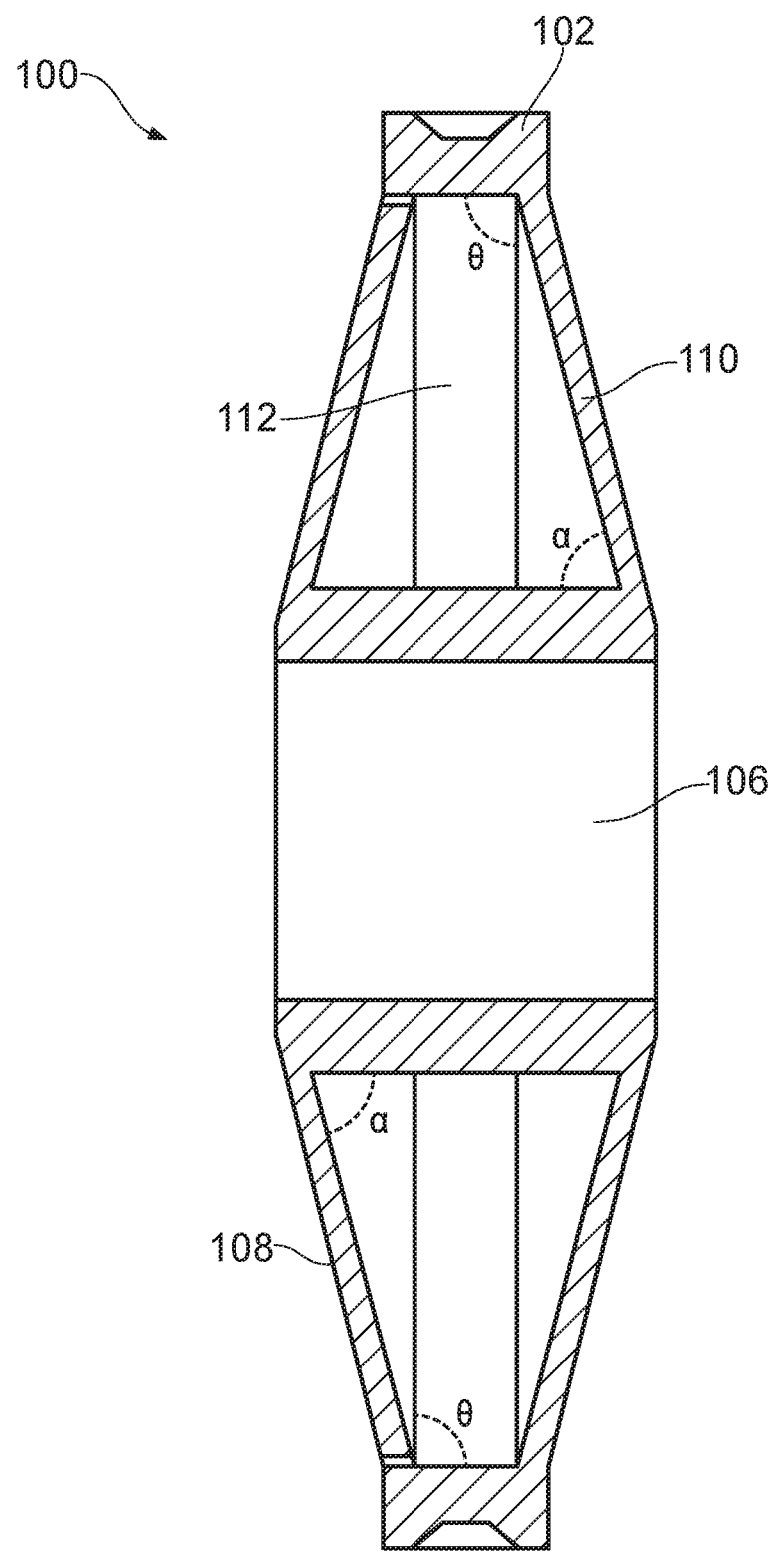
FIG. 2 is a cross-sectional view of the hollow gear of FIG. 1.
Figure 3:
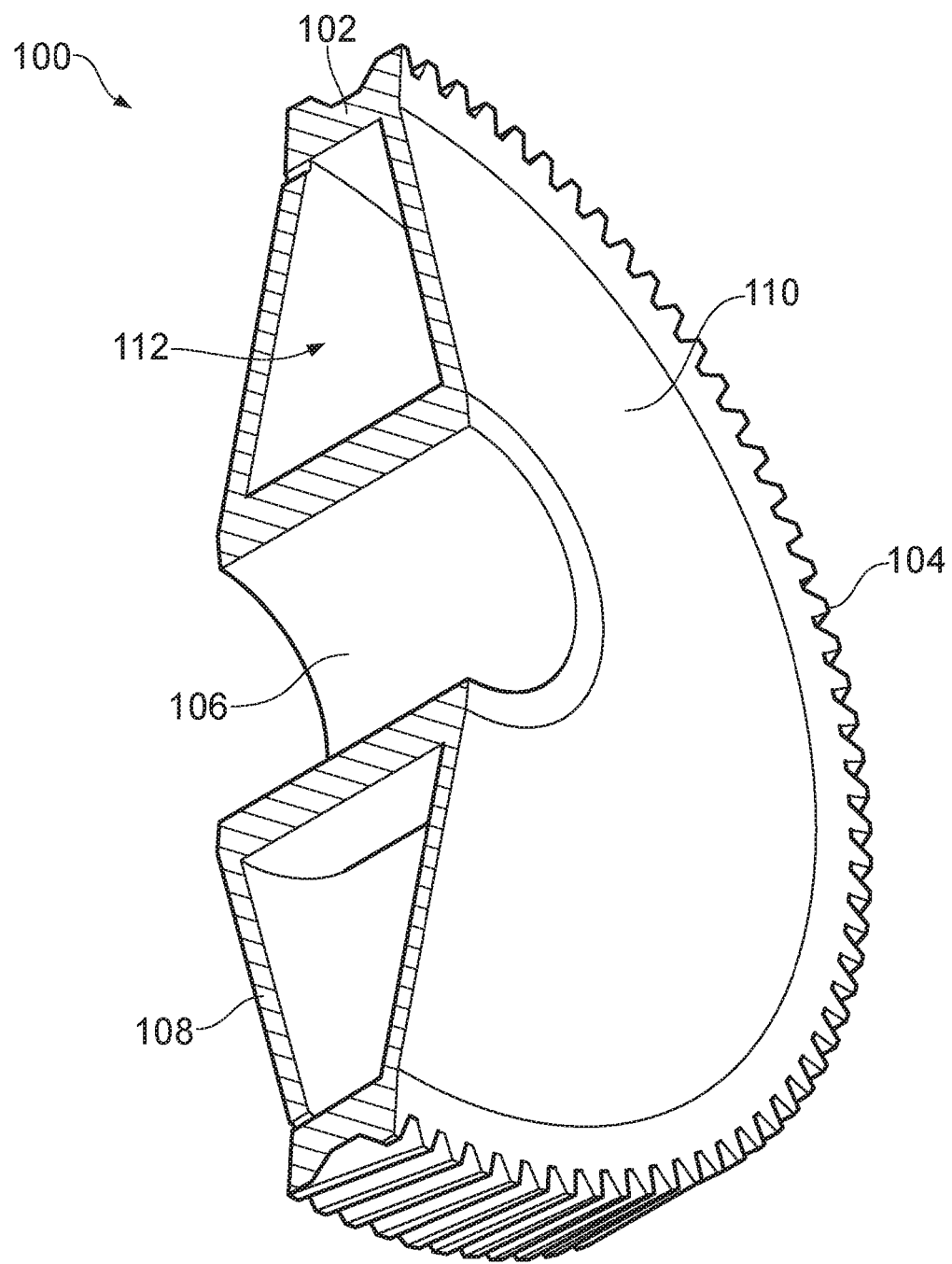
FIG. 3 is a perspective view of a cut-through of the hollow gear of FIG. 1.

FIGS. 1 to 3 show an example of a gear 100. The gear 100 is suitable for use in various transmission systems. The gear 100 is particularly useful in high speed transmission systems, in transmission systems under high loading or transmission systems where it is desirable to minimise weight. For example, the gear 100 may be used in a transmission system of a vehicle (e.g. a car, ship, helicopter), or a fixed machine requiring different rotational speeds and torques (e.g. a wind turbine). The gear 100 may be particularly useful for weight saving in transmission systems in the electric automotive industry where weight and performance are critical. Transmission systems are well known by those skilled in the art, so for brevity will not be described in detail.

The gear 100 includes an outer annular element 102. The outer annular element 102 extends around the outer periphery of the gear 100, forming an annular ring. The outer annular element 102 also extends in the axial direction to form a substantially cylindrical outer surface.

On the radially outer surface of the outer annular element 102 (i.e. on a peripheral surface of the gear 100), there are a plurality of gear teeth 104. The gear teeth 104 project radially outwardly from the radially outer surface of the outer annular element 102, so that in use the gear teeth 104 can mesh with gear teeth of an adjacent gear or pinion. In this example the gear teeth 104 are helical gear teeth, each forming a portion of a helix extending around the gear 100. In other words, the gear teeth 104 are arranged helically on the radially outer surface of the outer annular element 102. The gear teeth 104 are arranged parallel to each other and are equally spaced around the periphery of the gear 100.

In this example, the gear is about 200 mm in diameter, having an axial thickness at the outer periphery of about 22 mm. The gear teeth 104 project radially outwardly about 5 mm from the radially outer surface of the annular element 102. The gear teeth 104 are positioned at an angle of about 15° from the axial direction of the gear, each of the teeth forming a portion of a helix extending around the gear 100. The gear teeth 104 are arranged parallel to one another, with an equal pitch between each of the teeth of about 7 mm. The gear teeth 104 are formed integrally with the outer annular element 102.

The gear 100 also includes an inner support element 106. The inner support element 106 forms a radially inner portion of the gear 100 and is configured to support radially outer components of the gear (including the outer annular element 102). The inner support element 106 is arranged coaxially with the outer annular element 102, so that both the inner support element 106 and outer annular element 102 share the same axis of rotation.

The inner support element 106, in this example, is an axially extending shaft. The shaft is substantially cylindrical and has a hollow bore in this example. In other examples a solid shaft may be used. The axis of rotation of the gear 100 extends longitudinally through the centre of the shaft.

First and second opposing side walls 108, 110 connect the inner annular element 106 to the outer annular element 102. Each side wall 108, 110 extend from the outer annular element 102 to the inner support element 106. The inner support element 106, outer annular element 102 and first and second side walls 108, 110 form an annular space 112 inside the gear 100.

In cross-section, as shown in FIG. 2, each of the first and second side walls 108, 110 extend from the outer annular element 102 at an angle θ. The angle θ is greater than 90 degrees. The angle θ is the angle between the respective side wall and a radially inner surface of the outer annular element 102.

In this example, the outer annular element 102 is substantially cylindrical and extends axially (i.e. in a longitudinal direction parallel to the axis of rotation of the gear). Thus, the angle θ may alternatively be defined as the angle between the side wall and the axial direction.

The first and second side walls 108, 110, in this example each extend from the outer annular element 102 at an angle θ of about 110°. In this example, both side walls 108, 110 are constantly inclined between the outer annular element 102 and the inner support element. In this example, the first and second side walls 108, 110 are both substantially frusto-conical in shape.

Alternatively, the angle of the first and second side walls 108, 110 may be measured with respect to a direction perpendicular to the rotational axis (A-B) of the gear 100. Thus, the first and second side walls 108, 110 extend from the outer annular element 102 at an angle greater than 0 degrees with respect to the direction perpendicular to the rotational axis (A-B) of the gear 100. In the example shown in FIGS. 1 to 3, the first and second side walls extend from the outer annular element 102 at an angle of about 20° with respect to the direction perpendicular to the rotational axis (A-B) of the gear 100.

As seen best in FIGS. 1 and 2, the first and second side walls 108, 110 each flare outwardly from the outer annular element 102 towards the inner support element 106, so that the gear 100 is thicker (i.e. has a greater axial length) at the centre than at the outer periphery. That is, the axial length of the inner support element 106 is greater than an axial length of the outer annular element 102.

In other examples, the angle θ at which each side wall 108, 110 extends from the outer annular element 112 may aptly be between, 90° and 140°, or between 100° and 130°, or between 100° and 120°, or between 105° and 115°. That is, the first and second side walls 108, 110 may extend from the outer annular element 102 at an angle that is aptly between 0° and 50°, or between 10° and 40°, or between 10° and 30°, or between 15° and 25° with respect to the direction perpendicular to the rotational axis (A-B) of the gear 100.

Aptly, both the first and second side wall 108, 110 extend from the outer annular element 102 at the same angle (i.e. the first and second side walls 108, 110 each have equal and opposite angles of inclination).

Aptly, at least one of the side walls 108, 110 is constantly inclined between the outer annular element 102 and the inner support element 106 so that the side wall 108, 110 meets the inner support element at an angle α that is equal to 180° minus the angle θ. For example, where the angle θ is 110°, the angle α is 70°.

The angle of inclination of each of the first and second side walls 108, 110 is aptly constant along their respective lengths between the outer annular element 102 and the inner support element 106.

The thickness of each of the first and second side walls 108, 110 is configured to optimise the rigidity of the gear 100, whilst still maintaining a reduced weight compared to a solid gear. For example, a gear of 200 mm diameter that may be used in automotive applications may have first and second side walls 108, 110 with a wall thickness of between 2 mm and 6 mm. Aptly, the wall thickness may be about 4 mm.

The first and second side walls 108, 110 are rigidly connected to the inner support element 106 and the outer annular element 102 (e.g. via a weld). In other examples, the inner support element 106, outer annular element 102 and first and second side walls 108, 110 may be integrally formed (e.g. in a mould, or machined from a fabrication). In other examples, the side walls may be thermally expanded or shrunk to be fit and/or held in place with fixtures.

The components of the gear 100 (including the inner support element 106, first and second side walls 108, 110, outer annular element 102 and gear teeth 104) in this example are all formed from steel. In other examples, the outer annular element 102 could be made from a gear steel and the other components, 106, 108 and 110, could be made from cheaper steels or other materials. In another example each gear component could be made from any suitable materials, non-metallic or otherwise.

The gear 100 may be manufactured by first forming each of inner support element 106, outer annular element 102 (including gear teeth 104) and first and second side walls 108, 110. Each of these components may be cast, forged or machined from suitable steel using suitable tooling. The first and second side walls 108, 110 are then rigidly attached via a weld to each of the inner support element 106 and the outer annular element 102 to form the gear 100 having an annular space 112. Alternatively the outer annular element 102, one side wall 108 and the inner support element 106, can be machined from one solid piece as one component. Finally the remaining wall 110 can be welded in place. In some examples access holes, cut-outs or some other local features on the side walls 108 and 110 may also be provided.

In use, the gear 100 is arranged within a transmission system to mesh with one or more adjacent gears. The gear is therefore subject to gear loading forces from the adjacent gears. As discussed above, in general these forces can cause axial deflection and radial rotation of the gear annular element 102.

Table 1 below illustrates the differences in axial radial rotation of different gear types. The first gear is a typical solid gear with parallel side walls, having a gear rim width (i.e. thickness at the outer periphery) of 22 mm. The second gear is a solid gear shaped with frusto-conical sides also having a gear rim width of 22 mm. As shown in the table, the solid conical sided gear is significantly heavier than the solid parallel sided gear. The third gear is a hollow gear shaped with frusto-conical side walls, as per the embodiment of the invention discussed above in relation to FIGS. 1 to 3. The hollow conical sided gear also has a rim width of 22 mm and has a mass about 43% lighter than the solid parallel sided gear.

TABLE 1

| Gear Arrangement | Gear rim width | Gear Mass | Axial deflection | Radial rotation |
|---|---|---|---|---|
| Solid parallel sides | 22 mm | 5.2 kg | 0.0156 mm | 0.0004 rads |
| Solid conical sides | 22 mm | 7.25 kg | 0.004 mm | 0.0002 rads |
| Hollow conical sides | 22 mm | 2.97 kg | 0.0176 mm | 0.0001 rads |

Figure 5A:
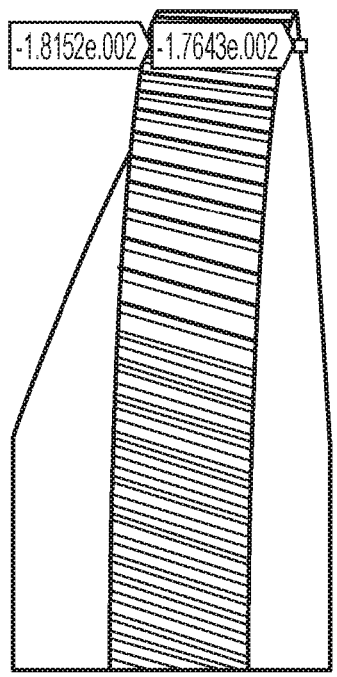
FIG. 5a shows axial translation of the hollow gear of FIG. 1.
Figure 5B:
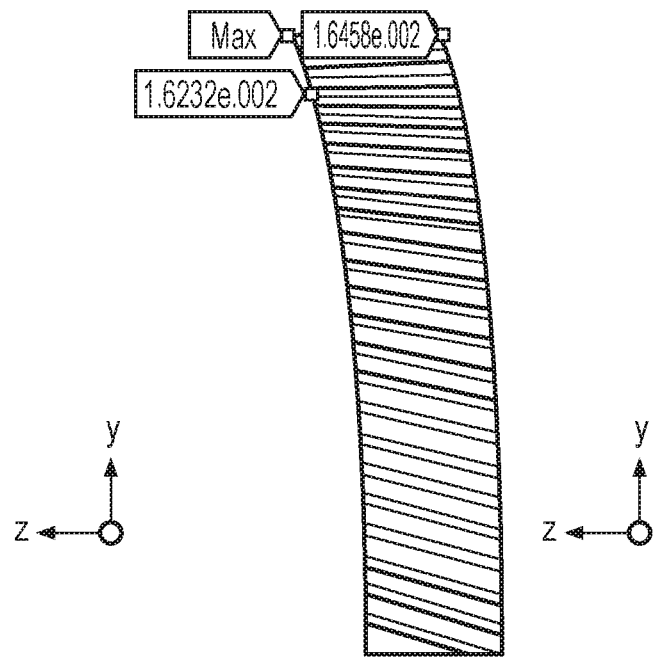
FIG. 5b shows axial translation of a solid, parallel sided gear.
Figure 6A:
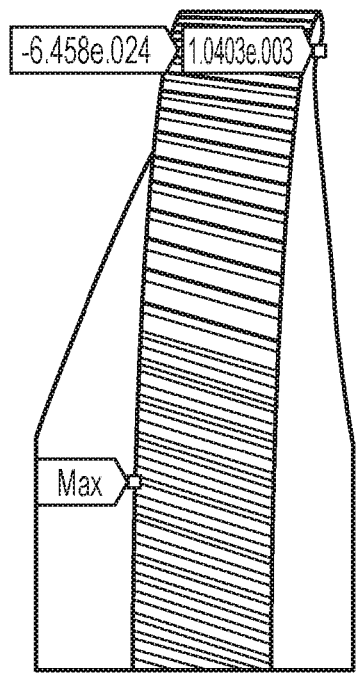
FIG. 6a shows radial rotation of the hollow gear of FIG. 1.
Figure 6B:
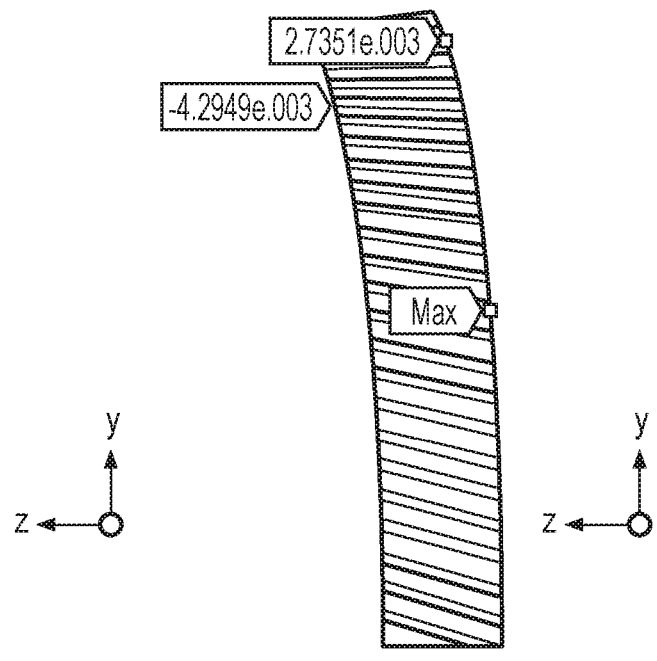
FIG. 6b shows radial rotation of a solid, parallel sided gear.

Each of the gears in Table 1 were subjected to typical and identical gear loading. As shown in the Table 1, the hollow conical sided gear has a 75% reduction in radial rotation compared to a solid parallel sided gear and a 50% reduction in radial rotation compared to a solid conical sided gear. FIGS. 5a and 5b illustrate the axial deflection effects of the hollow conical sided gear and the solid parallel sided gear respectively. FIGS. 6a and 6b illustrate the radial rotation effects of the hollow conical sided gear and the solid parallel sided gear respectively. It is clearly shown in FIGS. 6a and 6b that the hollow conical sided gear experiences significantly less radial rotation than the solid, parallel sided gear.

The rotational gear deflection causes each gear tooth, as it passes an adjacent gear tooth, to be misaligned, which results in unwanted premature tooth impacts, at tooth passing frequency. This often causes a higher frequency noise and also has a detrimental effect on the life of the gear.

This reduction in radial rotation of the hollow conical sided gear reduces misalignment of adjacent gear teeth, thereby reducing, non-conjugate local contact stress, transmission error and noise, thus reducing wear of the gears and therefore increasing lifetime of the gear.

Although the hollow conical sided gear has a slight increase in axial deflection, this is not critical as the linear translation does not generally result in misalignment of adjacent gear teeth, so does not have much of an effect on gear noise or wear.

Thus, as can be seen from Table 1, the hollow conical sided gear presents significant weight saving advantages over the traditional parallel sided solid gear as well as having a significant reduction in radial rotation (deflection). Similar effects can be seen in other examples of gears described herein in which at least one of the first and second side walls extends from the outer annular element at an angle greater than 90 degrees (i.e. gears in which the first and second side walls extend from the outer annular element at an angle that is greater than 0 degrees with respect to the direction perpendicular to the rotational axis of the gear).

Figure 4:
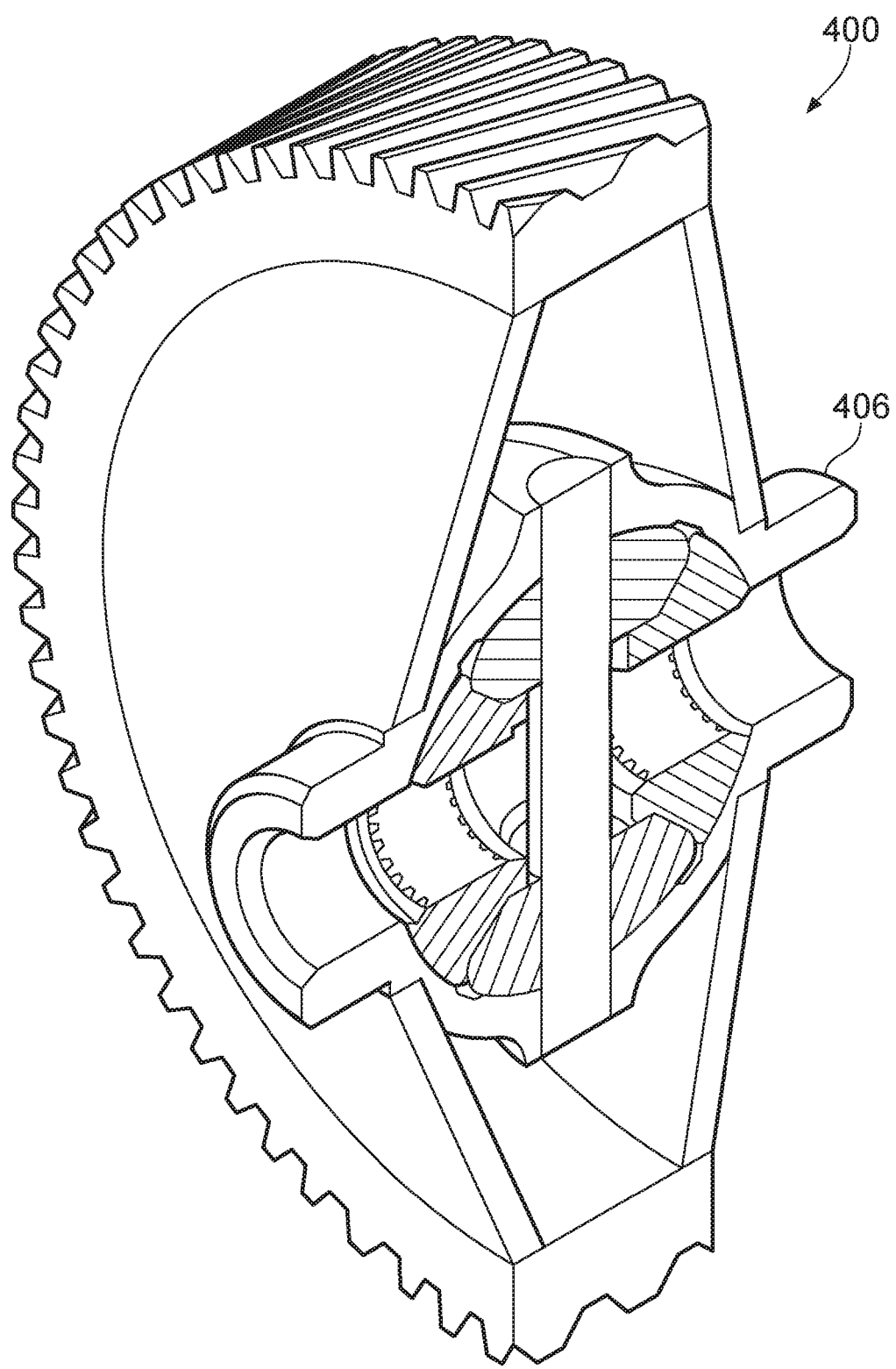
FIG. 4 is a perspective view of a cut-through of an example of a hollow gear, attached to a differential gear assembly.

In some examples, the gear 100 may form part of a differential gear assembly. FIG. 4 shows a gear 400 including a differential gear housing assembly having a differential gear shaft component 406 as the inner support element. In this example, the first and second side walls connect to the differential shaft component 406, containing the differential gears. The other components of the gear 400 may be configured to similarly to the gear 100 described in relation to FIGS. 1 to 3, so will not be described again in detail.

Although in the example described above, the gear includes helical gear teeth, other suitable gear teeth may be provided, depending on the intended use of the gear. For example, the gear teeth may be radially projecting, and extending in the axial direction to form a spur gear.

Although in the example described above both the first and second side walls each have equal and opposite angles of inclination, in other examples the first and second side walls may each have different angles of inclination. For example, the first side wall may extend between the outer annular element 102 and the inner support element 106 at an angle perpendicular to the axis of rotation of the gear 100, whilst the second side wall may extend from the outer annular element 102 at an angle greater than 90° (i.e. greater than 0 degrees with respect to the direction perpendicular to the axis of rotation of the gear). In another example both the first and second side walls may extend from the outer annular element at different angles greater than 90°. For example, the first side wall may extend from the outer annular element at an angle of about 100° (i.e. about 10 degrees with respect to the direction perpendicular to the axis of rotation of the gear), whilst the second side wall may extend from the outer annular element at an angle of about 110° (i.e. about 20 degrees with respect to the direction perpendicular to the axis of rotation of the gear).

In some examples, the first and second side walls may not be fully frusto-conical. For example, one or both of the side walls may include additional features that interrupt the frusto-conical shape. The additional features may include, for example, a region of the side wall having a different angle of inclination, or grooves or protrusions in the surface of the side wall. In other examples, at least one of the first and second side walls may have a continuous gradient in the angle of inclination (e.g. starting from an angle of 100° at the outer annular element and gradually increasing to an angle of inclination of 110° at the inner support element).

Although in the example described above, the inner support element is a shaft, the inner support element may alternatively be a different support structure. For example, the inner support element may be the housing of a differential gear assembly an example is shown in FIG. 4. In the example shown in FIG. 4, the first and second side walls each have a different angle of inclination. However, any angles of inclination as described above in relation to the example of FIG. 1 (including equal and opposite angles of inclination) may also be used.

Although the example described above relates to a specific size gear, the gear may be various sizes depending on the application. For example, the diameter of the gear may range from 50 mm to 4000 mm. Suitable angles of inclination of the first and second side walls may vary between different size gears and will be within the range discussed above for all sizes. However, the thickness of the side walls may be greater for larger diameter gears, where the gear teeth geometry will also change.

For example, a gear suitable for use in a wind turbine may have a diameter of between 0.5 and 4 m. The first and second side walls for a gear this size may be between 5 and 100 mm, and aptly around 40 mm. The gear teeth may project about the gear rim from the peripheral surface of the gear, and be spaced proportionate with the necessary increase in gear module.

With the above-described examples, the gear has a reduced weight compared to a solid gear, which can reduce costs of materials required for manufacture, costs associated with fuel economy (e.g. when used in a vehicle), and transportation and installation costs. Reduced weight gears are also more suitable for use in high speed transmission systems, particularly in the electric automotive or aerospace industries where weight reduction can significantly improve performance.

Although the gear has a significantly reduced weight, the configuration of the gear, particularly the side walls, helps the gear to retain or have even greater stiffness than a solid gear about important axes. The increased stiffness of the gear resists loading forces in use, so that radial rotation of the gear is reduced or minimised. The reduction in radial rotation of the gear rim has significant advantages in that misalignment of the gear teeth with teeth of adjacent gears is reduced. This prevents or significantly reduces non-conjugate tooth impacts as the teeth of adjacent gears mesh with one another. As such, local contact stress, transmission error and noise and wear of the gears are all reduced.

The positioning of the first and second side walls of the gear helps to resist gear loading forces, particularly in the axial direction, which helps to resist radial rotation of the gear rim. This helps to ensure that the teeth of the gear do not become misaligned with respect to adjacent gears, thereby reducing gear teeth contacts, reducing gear local contact stress, transmission error and noise, thus mitigating premature wear of the gears.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A gear for use in a transmission system, the gear comprising:
   an outer annular element having gear teeth arranged helically on a radially outer surface thereof;
   an inner support element arranged coaxially with the outer annular element; and
   first and second opposing side walls, each side wall extending from the outer annular element to the inner support element to form an annular space,
   wherein both of the first and second side walls extend from the outer annular element at an angle greater than 0 degrees with respect to a direction perpendicular to the rotational axis of the gear, and
   wherein each of the first and second side walls are constantly inclined between the outer annular element and the inner support element, and each of the first and second side walls are rigidly connected to or integral with each of the outer annular element and the inner support element such that the first and second side walls are configured to resist gear loading forces in the axial direction.

2. The gear according to claim 1, wherein at least one of the first and second side walls extends from the outer annular element at an angle between 10 and 50 degrees with respect to the direction perpendicular to the rotational axis of the gear.

3. The gear according to claim 1, wherein an angle of inclination of each of the first and second side walls is constant along their respective lengths between the outer annular element and the inner support element.

4. The gear according to claim 1, wherein the first and second side walls have equal and opposite angles of inclination.

5. The gear according to claim 1, wherein at least one of the first and second side walls is frusto-conical in shape.

6. The gear according to claim 1, wherein an axial length of the inner support element is greater than an axial length of the outer annular element.

7. The gear according to claim 1, wherein the inner support element is an axially extending shaft.

8. The gear according to claim 1, wherein the inner support element comprises a differential gear assembly.

9. The gear according to claim 1, wherein the first and second side walls have a wall thickness between 2 mm and 6 mm.

10. A transmission system comprising the gear of claim 1.

* * * * *